United States Patent [19]

Gehring

[11] 4,148,355

[45] Apr. 10, 1979

[54] WATER HEATING SYSTEM AND COMBINED STORAGE TANK AND HEAT EXCHANGER UNIT THEREFOR

[75] Inventor: Kenneth C. Gehring, Cottage Grove, Wis.

[73] Assignee: DEC International, Inc., Madison, Wis.

[21] Appl. No.: 779,924

[22] Filed: Mar. 21, 1977

Related U.S. Application Data

[63] Continuation-in-part of Ser. No. 734,446, Oct. 21, 1976, abandoned.

[51] Int. Cl.² .......................... F25B 27/02; F25J 3/00
[52] U.S. Cl. .................................. 165/39; 165/104 S; 62/184; 62/238; 122/37; 219/314
[58] Field of Search ................. 165/104 S, 39; 62/238 W, 184; 122/37; 219/312, 314; 165/132

[56] References Cited

U.S. PATENT DOCUMENTS

| 2,224,131 | 12/1940 | Bailey | 219/314 |
| 2,740,269 | 4/1956 | Buehler, Jr. | 165/169 X |
| 2,834,865 | 5/1958 | Coates | 219/314 |

Primary Examiner—Albert W. Davis, Jr.
Attorney, Agent, or Firm—Michael, Best & Friedrich

[57] ABSTRACT

A combined storage tank and heat exchanger unit for heating water including a watertight tank having a water inlet in the lower portion thereof and a pair of water outlets in the upper portion thereof. The wall of the tank is in the form of a double wall jacket having a hot refrigerant inlet at the top portion thereof and a hot refrigerant outlet at the bottom portion thereof. A cylindrical heat barrier is mounted inside the tank and spaced a short distance from the inside surface of the jacket wall to thermally isolate a relatively small amount of water in the tank in direct contact with the inner surface of the jacket. A heat barrier disc is mounted in the tank and extends horizontally across the interior thereof to thermally isolate the water in the top portion of the tank from the water in the bottom portion thereof. The water outlets communicate with the interior of the tank on opposite sides of the partition to provide heated water at two distinctly different temperatures. An air passageway is provided between the outer surface of the jacket and the inner surface of the outer shell through which air is circulated to heat the room in which the unit is located.

18 Claims, 8 Drawing Figures

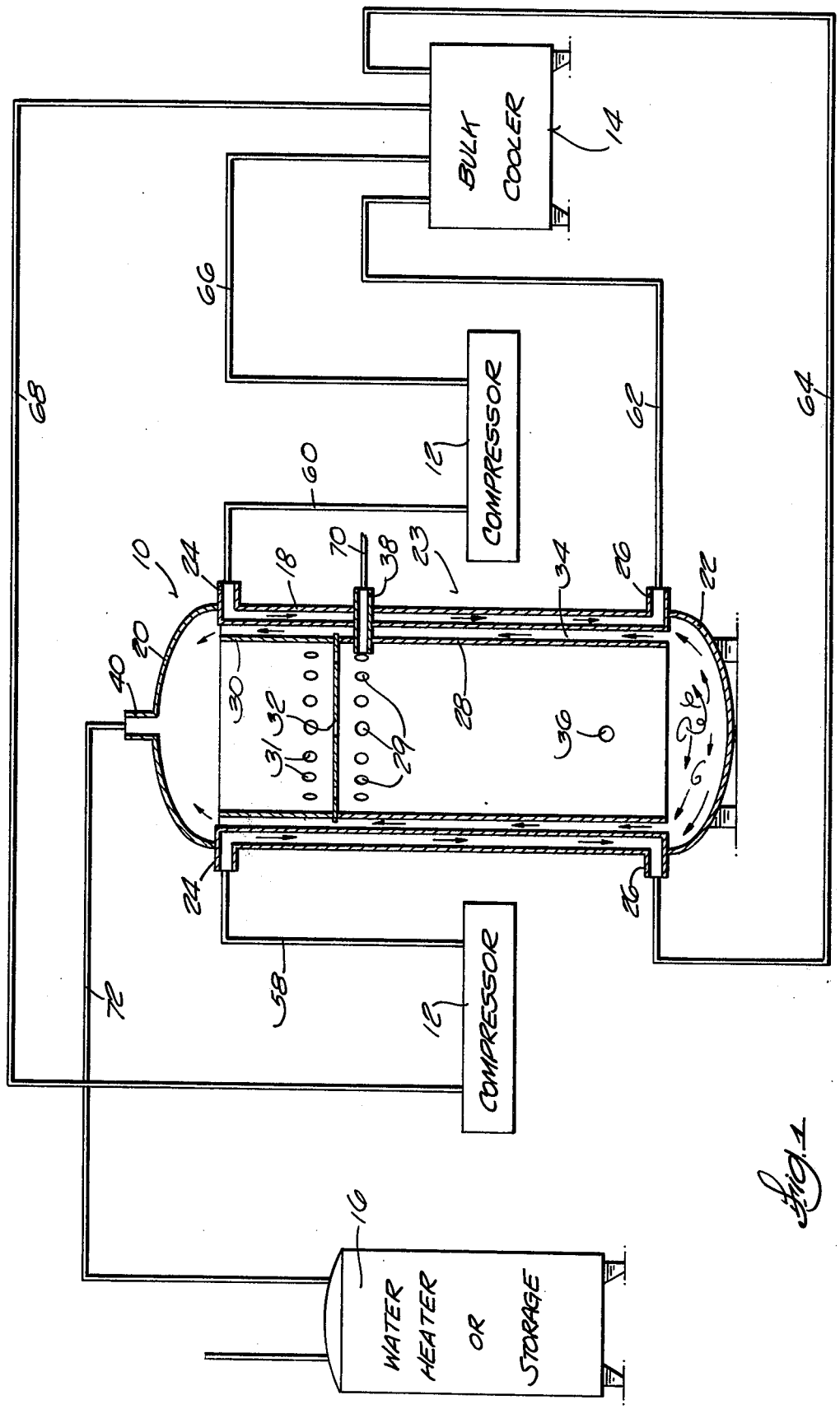

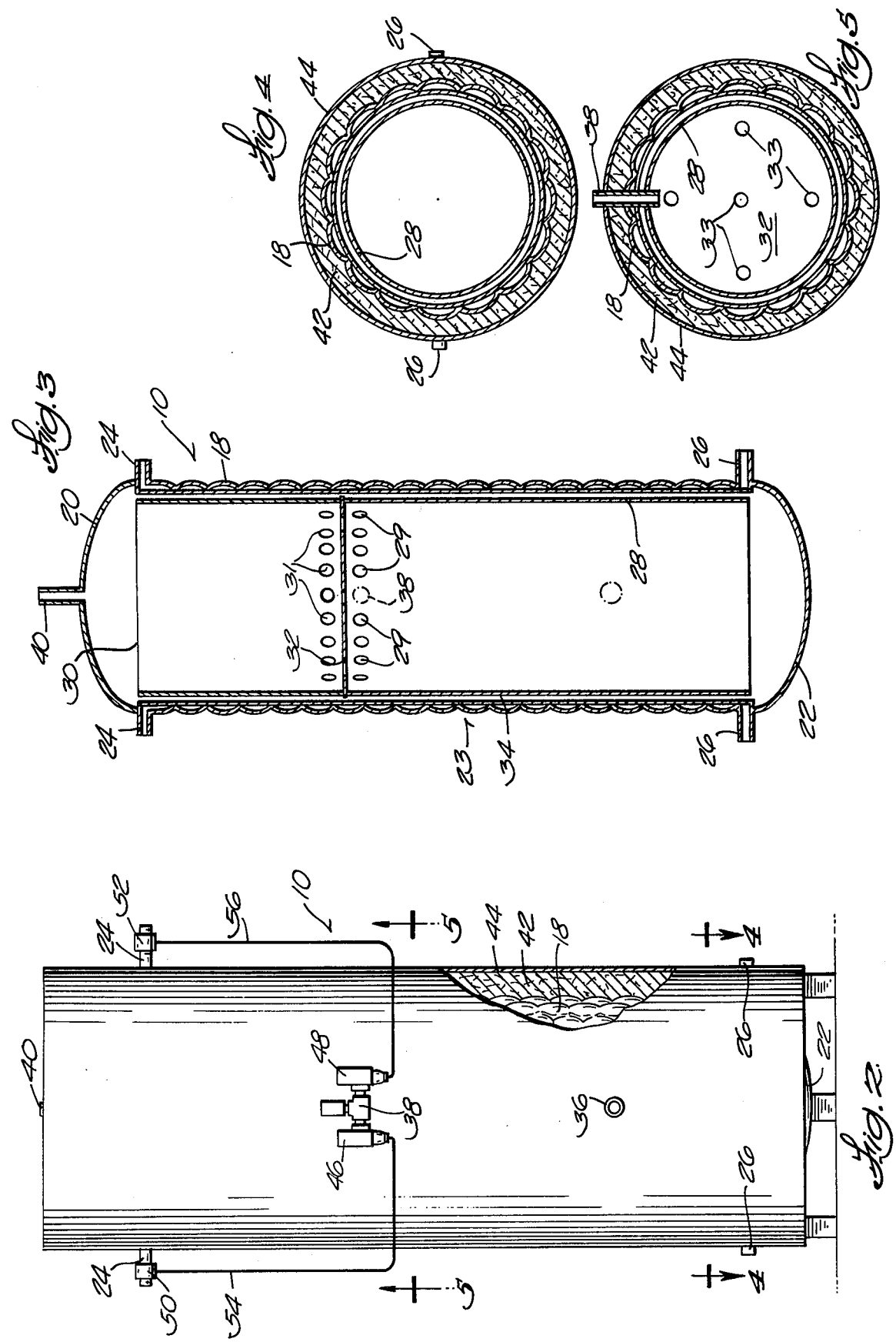

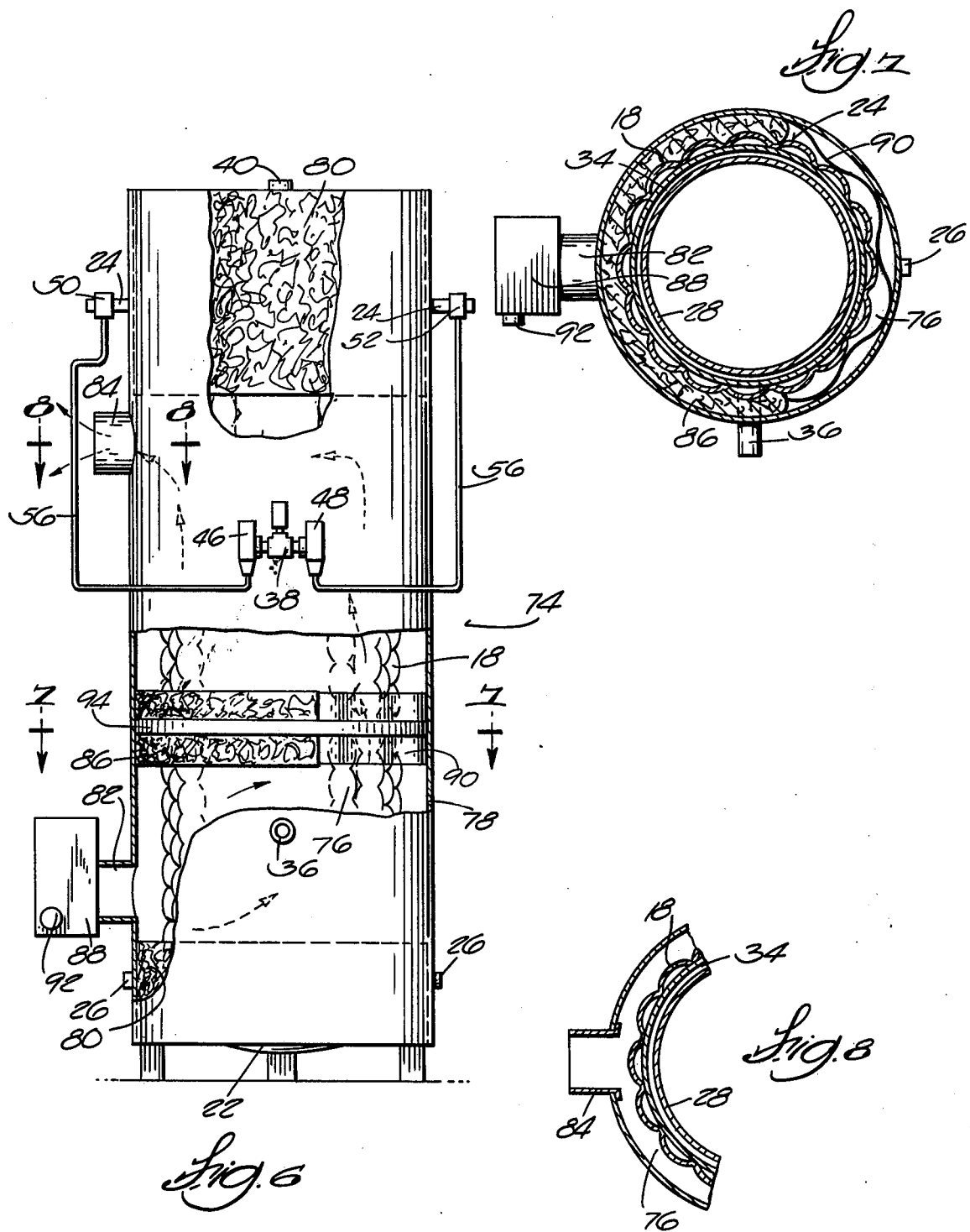

WATER HEATING SYSTEM AND COMBINED STORAGE TANK AND HEAT EXCHANGER UNIT THEREFOR

CROSS-REFERENCE TO RELATED APPLICATION

This is a continuation-in-part of application Ser. No. 734,446 filed Oct. 21, 1976 now abandoned.

BACKGROUND OF THE INVENTION

I. Field of the Invention

This invention relates to a system for heating water and more particularly to a novel combined storage tank and heat exchanger unit for use in the system.

II. Description of the Prior Art

A state of the art search directed to the subject matter of this application uncovered the following patents:

U.S. Pat. Nos. 1,786,861, 2,562,651, 1,830,195, 2,632,306, 1,967,136, 2,668,420, 2,007,426, 2,716,866, 2,095,017, 2,751,761, 2,310,234, 3,472,314, 2,355,551 3,507,324, 2,412,774, 3,578,074, 2,516,094, 3,807,192, 2,561,465, 3,934,821.

None of the prior art uncovered in the search discloses a system like that of the present invention which operates to produce heated water at two useful and distinctly different temperatures. This is accomplished by using the hot refrigerant from a refrigeration compressor which can be operated at pressures and temperatures within an optimum range of efficiency and durability for the unit.

SUMMARY OF THE INVENTION

A combined storage tank and heat exchanger unit for heating and storing water comprising a liquid-tight tank having a liquid inlet means and a liquid outlet means. The tank further includes a jacket wall forming at least a portion of the outer wall of the tank. The jacket wall has an inlet and an outlet and a passageway means extending within the jacket wall from the inlet to the outlet through which a hot fluid can be transmitted to heat the liquid inside the tank. A heat barrier means is mounted inside the tank and spaced a short distance from the inside surface of the jacket wall to thermally isolate a relatively small volume of liquid in direct contact with the inside surface of the jacket to thereby heat said small volume at a relatively fast rate.

DESCRIPTION OF THE DRAWINGS

FIG. 1 is a partially schematic view of the water heating system of the present invention;

FIG. 2 is a side elevation view (with parts broken away) of the heat exchanger unit of the water heating system shown in FIG. 1;

FIG. 3 is a vertical sectional view of the heat exchanger unit shown in FIG. 2 with the outer jacket and insulation removed;

FIG. 4 is a sectional view taken along line 4—4 of FIG. 2;

FIG. 5 is a sectional view taken along line 5—5 of FIG. 2;

FIG. 6 is a side elevation view (with parts broken away) of an alternative embodiment of the heat exchanger unit shown in FIG. 2-5;

FIG. 7 is a sectional view taken along line 7—7 of FIG. 6; and

FIG. 8 is a fragmentary sectional view taken along line 8—8 of FIG. 6.

DESCRIPTION OF THE PREFERRED EMBODIMENT

While the present invention may have several useful applications, it was designed particularly for use by the dairy farmer and for purposes of explanation the description herein will be directed to a typical dairy farm installation.

Referring to the schematic view of the system as shown in FIG. 1, the system is comprised of a heat exchanger unit 10, a pair of compressors 12, 12, a bulk cooler 14 and a water storage and/or heater unit 16, the latter unit being optional.

The heat exchanger unit 10 is comprised of an outer jacket wall 18 having upper and lower head members 20 and 22 fastened thereto to form a watertight tank 23. Jacket wall 18 can be of any suitable construction which provides a sealed cylindrical conduit through which fluid can be circulated from one end to the other. In the embodiment shown in the drawings (FIGS. 2, 3 and 4) jacket 18 is in the form of a pair of metal sheets welded together with fluid passages therebetween to form a fluid conveying heat transfer member. Examples of suitable jacket constructions are described in detail in U.S. Pat. No. 3,458,917.

Jacket 18 is provided with a pair of inlet connections 24, 24 and a pair of outlet connections 26, 26. In the preferred embodiment jacket 18 and head members 20, 22 are made from stainless steel.

Inside the watertight tank 23 formed by jacket 18, head 20 and head 22 are mounted a pair of cylindrical heat barrier members 28 and 30. Members 28 and 30 are of the same diameter with the two members mounted in concentric relationship with each other. A disc-shaped heat barrier member 32 is mounted between members 28 and 30. In the preferred embodiment members 28, 30 and 32 are made of fiberglass material. It is noted at this point that members 28 and 30 are dimensioned so that the outer surfaces thereof will be spaced a relatively small distance from the inner surface of jacket 18 to thereby provide a relatively narrow cylindrical passageway 34 extending from one end of the tank 23 to the other. Disc 32 is provided with a plurality of openings 33 (FIG. 5) to permit free circulation of water from one side of the disc to the other. Heat barrier member 28 is provided with a plurality of openings 29 around the upper edge thereof and heat barrier member 30 is provided with a plurality of openings 31 around the lower edge thereof.

The tank 23 is provided with a cold water inlet 36 and warm and hot water outlets 38 and 40. Outlet 38 extends through heat barrier member 28 to communicate directly with the water inside member 28.

As shown in FIG. 2, heat exchanger unit 10 is provided with an external layer 42 of insulation and an outer jacket 44 enclosing the layer of insulation. For control purposes, as will be explained in greater detail hereinafter, a pair of pressure-sensitive flow regulating water valves 46, 48 are mounted at the warm water outlet 38. Valves 46, 48 are connected to pressure sensing coupling assemblies 50, 52 mounted at hot refrigerant inlets 24, 24 by tubes 54, 56.

Hot refrigerant gas (preferably freon) is carried from compressors 12, 12 to inlets 24, 24 of jacket wall 18 by conduits 58, 60. Condensed refrigerant is carried from jacket wall outlets 26, 26 to bulk cooler 14 by conduits 62, 64. Evaporated refrigerant from bulk cooler 14 is carried back to compressors 12, 12 by conduit 66, 68.

In the water portion of the system heated water is carried from heated water outlets 38 and 40 by service lines 70, 72. As indicated previously, a water heater or storage tank 16 can be provided depending upon the particular needs of the farm in which the system is installed.

Referring now to the alternative embodiment of the heat exchanger unit shown in FIGS. 6, 7 and 8, such unit is similar to that shown in FIGS. 2-5 and accordingly like parts of the respective units have been given identical reference numerals.

The heat exchanger unit 74 shown in FIGS. 6-8 is comprised of a jacket wall 18 which together with end cap members form a watertight tank identical to tank 23 as shown in FIG. 3.

Jacket 18 is provided with a pair of inlet connections 24, 24 and a pair of outlet connections 26, 26. Inside the watertight tank are mounted a pair of cylindrical heat barrier members 28 and 30 and a disc-shaped heat barrier member 32 mounted between members 28 and 30. The specific shape and mounting arrangement of the heat barrier members is shown in FIG. 3. Just as in unit 10, as shown in FIG. 3, there is a narrow cylindrical passageway 34 extending from one end of the tank to another in the unit 74.

The watertight tank is provided with a cold water inlet 36 and warm and hot water outlets 38 and 40, respectively.

For control purposes a pair of pressure sensitive flow regulating water valves 46, 48 are mounted at the warm water outlet 38. Valves 46, 48 are connected to pressure sensing coupling assemblies 50, 52 mounted at hot refrigerant inlets 24, 24 by tubes 54, 56.

Up to this point in the description the construction of heat exchanger unit 74 (FIGS. 6-8) has been identical to that of heat exchanger unit 10 (FIGS. 2-5). The principal difference between the two units is that in unit 74 an air passageway 76 is provided between the outer surface of jacket member 18 and the inner surface of the outer jacket 78. More specifically, such air passageway is provided by installing installation material 80 between jackets 18 and 78 only below an air inlet 82 and above an air outlet 84 to thus provide a flow passageway 76 between such inlet and outlet. To more effectively direct the air flow from inlet 82 to outlet 84, from the standpoint of maximizing heat transfer between the jacket 18 and the air, a barrier 86 of insulation material is positioned between the inlet 82 and the outlet 84. The barrier 86 partially encircles the jacket portion 18 of watertight tank 24 between inlet 82 and outlet 84 to thereby cause the air circulating through passageway 76 to flow in a circuitous path as shown by the arrows in FIG. 3.

A blower fan unit 88 of any suitable design may be mounted at air inlet 82 for purposes of forcing air to flow from the inlet through passageway 76 to outlet 84. Fan unit 88 is provided with a thermostatically controlled on-off switch 92 which operates to turn the fan on and off at a predetermined minimum and maximum ambient temperature. As shown in FIGS. 6 and 7, a corrugated filler member 90 of fiberglass or other suitable material is mounted in the air passageway space 76 opposite insulation barrier 86 to provide structural support between the outer jacket 78 and the inner jacket 18 without materially restricting air flow therethrough. Insulation barrier 86 and filler material 90 are held in place on jacket 18 by a strap 94.

OPERATION

The operation of the system can best be described by reference to FIG. 1. While the system of the present invention can be operated under a variety of specific operating conditions, only one typical operation installation will be described herein.

In a typical milking cycle normally the farmer's initial need for heated water is for the purpose of preparing the first cows of the herd to be milked and for sanitizing the milking pipelines. With the system of the present invention such water would normally be obtained from heat exchanger unit 10 which contains some heated water remaining from the prior milking cycle.

As milking of the herd begins, warm milk will be introduced into bulk cooler 14. When the milk in the coller reaches a predetermined thermostatically controlled minimum temperature, the refrigeration system will be started. Upon energization of compressors 12, 12 hot freon gas will flow therefrom through conduits 58, 60 to inlets 24, 24 of jacket wall 18. As the hot freon refrigerant passes downwardly through jacket 18, it will give up heat to the water inside tank 23, causing the freon gas to condense.

The condensed freon travels to bulk cooler 14 through conduits 62, 64 where it is passed through a suitable evaporation means (not shown) to provide the desired cooling action at the bulk cooler in a conventional manner. From the bulk cooler the relatively cold freon gas flows back to compressors 12, 12 through conduits 66, 68.

Turning now to the water circulating portion of the system, in the typical installation described herein tank 23 is sized to hold about 90 gallons of water below disc barrier 32 and about 50 gallons of water above disc 32. Cold water to be heated enters heat exchanger unit 10 through inlet 36 in the lower portion thereof. As shown by the arrows in FIG. 1, the water in tank 23 will circulate upwardly in the relatively narrow cylindrical passageway 34 formed between the inner surface of jacket wall 18 and the outer surfaces of heat barrier cylinders 28, 30. It should be noted at this point that the heat barrier means provided by members 28 and 30 serves to thermally isolate a relatively small volume of water in direct contact with the hot inner surface of jacket 18. The result is that such isolated volume of water will be heated at a relatively rapid rate (as compared to the water in the rest of the tank) causing such water to rise relatively rapidly in passageway 34.

As the water circulates upwardly in passageway 34, its temperature will gradually increase. When the water in passageway 34 reaches the heat barrier disc 32, a portion thereof will circulate into the interior of the tank through openings 29 and 31 and a portion thereof will continue upwardly in passageway 34 to the top portion of the tank, such later portion being heated to a higher temperature.

Within a matter of minutes after compressors 12, 12 are started, medium temperature water suitable for preparing additional cows for milking will be available at warm water outlet 38 of unit 10. Such warm water will be used more or less continuously through the milking cycle to prepare the full herd for milking.

During the milking cycle, which lasts anywhere from approximately one hour to two and one-half hours depending on the size of the herd, the water in the upper portion of the tank 23 above disc 32 will be heated to a relatively hot temperature and thus at the end of the milking cycle there will be 50 gallons of hot water available to the farmer for washing the milking equipment.

While it will be appreciated that the specific temperatures and pressures of the typical installation described herein will vary somewhat during the milking cycle, when such typical installation reaches a state of general equilibrium, the following temperatures and pressures will prevail.

The hot freon gas from compressors 12, 12 entering jacket 18 through inlets 28, 28 will be at a temperature of about 220° F. and at a pressure of about 275 p.s.i. The condensed freon leaving jacket wall 18 through outlets 26, 26 will be at a temperature of about 110° F. and a pressure of about 270 p.s.i. At such freon temperatures and pressures the warm water available for preparing cows for milking at outlet 38 will be approximately 110° F. assuming a cold water supply temperature of about 65° F.

As indicated previously, the continuous running of the system will cause the temperature in the upper portion of the tank 23 to heat to a relatively higher temperature. The temperatures which will prevail in the upper tank portion are set forth in the following table:

| NO. AND SIZE OF COMPRESSORS | TIME (HRS.) | | |
|---|---|---|---|
| | 1½ | 2 | 2½ |
| (1) 3HP | 140* | 150 | 160 |
| (1) 4HP | 145 | 155 | 165 |
| (1) 5HP | 150 | 160 | 170 |
| (2) 3HP | 155 | 165 | 175 |
| (2) 4HP | 165 | 175 | 185 |
| (2) 5HP | 175 | 185 | 190 |

*degrees F.

The operating conditions described above are maintained by a water flow regulating means including pressure sensitive water regulating valves 46, 48 at warm water outlet 38. As explained previously, the valves 46, 48 are connected to freon inlet pressure couplings 50, 52 by tubes 54, 56. The components are set so that when the refrigerant pressure at couplings 50, 52 reaches about 275 p.s.i. (equivalent to about a 1300 condensing temperature) the corresponding valves 46, 48 will open, allowing warm water to flow out of the unit 10 through outlet 38. If no need for warm water is present at such time, the water will simply be allowed to flow to storage or drain.

It will be apparent from the foregoing that such control arrangement will automatically control the maximum temperature and pressure at the hot refrigerant outlet of the compressors 12, 12 and at the same time provide heated water for the farmer at two separate and desirable temperatures. The unit accomplishes this objective without utilizing excessively high freon pressures at the compressor outlet to thereby maintain the efficiency of the compressors and maximize its operating life span. Thus, the refrigeration system, particularly the compressors, can be operated under efficient and maximum durability conditions to produce the heated water required by the farmer during a normal milking cycle. This is accomplished with components and controls of relatively simple and economic design.

The operation of heat exchanger unit 74 is quite similar to that of unit 10 described above. The hot water and freon portions of the overall system using unit 74 are essentially the same as that described above with respect to unit 10.

Unit 74 provides an additional function, namely, the heating of the surrounding air in the location in which the unit is installed. This is accomplished by the provision of air passageway 76 inside outer jacket 78. In operation when the ambient temperature at the unit reaches a predetermined minimum (40° F. for example) thermostatic control 92 will turn on the fan 88, causing cool air from outside the unit to be forced into passageway 76 through air inlet 82. Air circulates (as shown by the arrows in FIG. 6) from inlet 82 up and around the ends of insulation barrier 86 and then out through outlet 84. As the air flows over the exposed heated outer surface of inner jacket 18, it will be heated so that the air passing into the surrounding area through outlet 84 will be at a higher temperature than the air entering the unit through inlet 88.

The unit thus serves not only to heat water for use by the farmer but also serves to heat the enclosed area in which the unit is installed. The heat available for heating air as described above will depend primarily on the amount of hot water required by the farmer and the size and number of compressors used in the system. Experience has shown that in most installations there will be a surplus of heat available for heating the surrounding air as well as the water required for milking, and thus a unit 74 like that described above and shown in FIGS. 6, 7 and 8 can be used to advantage in many installations. In this regard it should be appreciated that the air heating feature of unit 74 can be incorporated into the unit with very little additional cost over that required in the unit 10 design. The result is that the air heating unit 74 can serve to make maximum utilization of the energy in the hot freon gas available in a conventional refrigeration system normally employed by the dairy farmer to cool the milk produced by the cows.

I claim:

1. A combined storage tank and heat exchanger unit for heating and storing a liquid such as water and the like comprising:

a liquid-tight tank means including a liquid inlet means in the lower portion thereof and a liquid outlet means in the upper portion thereof, said liquid-tight tank means further including a vertically positioned cylindrical jacket wall means forming at least a portion of the outer wall of said liquid-tight tank means, said jacket wall means having an inlet means in the upper portion thereof and an outlet means in the lower portion thereof and a passageway means extending within the jacket wall means from said inlet to said outlet means, said passageway means being sealed from the interior of said liquid-tight tank means; and a heat barrier means mounted inside said liquid-tight tank means, said heat barrier means including a cylindrical heat barrier member spaced a short distance from the inside cylindrical surface of said jacket wall means to thermally isolate a relatively small volume of liquid in said liquid-tight tank means in direct contact with the inside surface of said jacket wall means;

said heat barrier means further including a disc-shaped heat barrier partition extending substantially across the interior of said liquid-tight tank means in the upper portion thereof, said heat barrier partition serving to thermally isolate the liquid in the top portion of the liquid-tight tank means from the liquid in the bottom portion thereof, and in which said liquid outlet means for said liquid-tight tank means includes a pair of liquid outlets located on opposite sides of said heat barrier partition, said cylindrical heat barrier member has a plurality of openings therethrough around the periphery thereof immediately below said heat barrier partition.

2. A combined storage tank and heat exchanger unit according to claim 1 in which said heat barrier partition has a plurality of openings therethrough.

3. A combined storage tank and heat exchanger unit according to claim 2 in which said heat barrier member has a plurality of openings therethrough around the periphery thereof immediately above said heat barrier partition.

4. A combined storage tank and heat exchanger unit according to claim 1 in which said jacket wall means is in the form of a pair of metal sheets welded together with fluid passages therebetween to form a fluid conveying heat transfer member.

5. A water heating system comprising:
a source of hot fluid;
a combined storage tank and heat exchanger unit including a watertight tank means having a water inlet means in the lower portion thereof and a water outlet means in the upper portion thereof, said watertight tank means further including a cylindrical jacket wall means forming at least a portion of the outer wall of the watertight tank means, said jacket wall means having an inlet means in the upper portion thereof in communication with said source of hot fluid, said jacket wall means further including an outlet means in the lower portion thereof and a passageway means extending within the jacket wall means from said inlet to said outlet means through which hot fluid can flow, said passageway means being sealed from the interior of said watertight tank means, said watertight tank means further including a heat barrier means mounted inside said watertight tank means, said heat barrier means including a cylindrical heat barrier member spaced a short distance from the inside cylindrical surface of said jacket wall means to thermally isolate a relatively small volume of water in said watertight tank means in direct contact with the inside surface of said jacket wall means;
a source of water in communication with said water inlet means;
said heat barrier means further including a disc-shaped heat barrier partition extending horizontally substantially across the interior of said watertight tank means in the upper portion thereof, said heat barrier partition serving to thermally isolate the water in the top portion of the watertight tank means from the water in the bottom portion thereof, and in which said water outlet means for said watertight tank means includes first and second water outlets located on opposite sides of said heat barrier partition; and
a pressure sensitive water flow control valve means located at said first water outlet, said pressure sensitive water flow control valve means operatively connected to said hot fluid inlet means so that when the pressure at said hot fluid inlet means reaches a certain predetermined maximum said valve means will open to allow heated water to flow out said first water outlet to thereby automatically control the maximum pressure of said hot fluid at said hot fluid inlet.

6. A water heating system according to claim 5 in which said cylindrical heat barrier member has a plurality of openings therethrough around the periphery thereof immediately below said heat barrier partition.

7. A water heating system according to claim 6 in which said heat barrier partition has a plurality of openings therethrough.

8. A water heating system according to claim 7 in which said heat barrier member has a plurality of openings therethrough around the periphery thereof immediately above said heat barrier partition.

9. A water heating system according to claim 5 in which said jacket wall means is in the form of a pair of metal sheets welded together with fluid passages therebetween to form a fluid conveying heat transfer member.

10. A combined storage tank and heat exchanger unit for heating and storing a liquid such as water and the like comprising:
a liquid-tight tank means including a liquid inlet means and a liquid outlet means, said liquid-tight tank means further including a jacket wall means forming at least a portion of the outer wall of said liquid-tight tank means, said jacket wall means having an inlet means and an outlet means and a passageway means extending within the jacket wall means from said inlet means to said outlet means, said passageway means being sealed from the interior of said liquid-tight tank means;
heat barrier means mounted inside said liquid-tight tank means, said heat barrier means spaced a short distance from the inside surface of said jacket wall means to thermally isolate a relatively small volume of liquid in said liquid-tight tank means in direct contact with the inside surface of said jacket wall means; and
an outer jacket means for said liquid-tight tank means, said outer jacket means having an air inlet and an air outlet spaced with an air passageway extending therebetween said inlet and outlet through which air can circulate while in contact with the outer surface of said jacket wall means of said liquid-tight tank means.

11. A combined storage tank and heat exchanger unit according to claim 10 in which a fan means is mounted in said passageway to cause air to flow more readily from said air inlet to said air outlet through said air passageway.

12. A combined storage tank and heat exchanger unit according to claim 10 in which said inlet is located in the bottom portion of said outer jacket means and said outlet is located in the top portion of said outer jacket means.

13. A combined storage tank and heat exchanger unit according to claim 12 in which said fan means is mounted at said air inlet.

14. A combined storage tank and heat exchanger unit according to claim 10 in which said outer jacket means includes an outer jacket member of insulating material surrounding said jacket wall means and spaced therefrom, said outer jacket means further including insulation material mounted in a first portion of the space between said jacket wall means and said outer jacket member thereby leaving a second portion of the space between said jacket wall means and said outer jacket member open, said open space providing said air passageway.

15. A water heating system comprising:
a source of hot fluid;
a combined storage tank and heat exchanger unit including a watertight tank means having a water inlet means in the lower portion thereof and a water outlet means in the upper portion thereof, said watertight tank means further including a cylindrical jacket wall means forming at least a portion of the outer wall of the watertight tank means, said jacket wall means having an inlet means in the upper portion thereof in communication with said source of hot fluid, said jacket wall means further including an outlet means in the lower portion thereof and a passageway means extending within the jacket wall means from said inlet to said outlet means through which hot fluid can flow, said passageway means being sealed from the interior of said watertight tank means, said watertight tank means further including a heat barrier means mounted inside said watertight tank means, said heat barrier means including a cylindrical heat barrier member spaced a short distance from the inside cylindrical surface of said jacket wall means to thermally isolate a relatively small volume of water in said watertight tank means in direct contact with the inside surface of said jacket wall means;
a source of water in communication with said water inlet means; and
an outer jacket means for said liquid-tight tank means, said outer jacket means having an air inlet and an air outlet spaced with an air passageway extending therebetween said inlet and outlet through which air can circulate while in contact with the outer surface of said jacket wall means of said liquid-tight tank means.

16. A water heating system comprising:
a source of hot fluid;
a combined storage tank and heat exchanger unit including a watertight tank means having a water inlet means in the lower portion thereof and a water outlet means in the upper portion thereof, said watertight tank means further including a cylindrical jacket wall means forming at least a portion of the outer wall of the watertight tank means, said jacket wall means having an inlet means in the upper portion thereof in communication with said source of hot fluid, said jacket wall means further including an outlet means in the lower portion thereof and a passageway means extending within the jacket wall means from said inlet to said outlet means through which hot fluid can flow, said passageway means being sealed from the interior of said watertight tank means,
a source of water in communication with said water inlet means; and
an outer jacket means for said combined storage tank and heat exchanger unit, said outer jacket means having an air inlet and an air outlet spaced with an air passageway extending therebetween said inlet and outlet through which air can circulate while in contact with the outer surface of said jacket wall means of said liquid-tight tank means.

17. A water heating system according to claim 22 in which said outer jacket means includes an outer jacket member of insulating material surrounding said jacket wall means and spaced therefrom, said outer jacket means further including insulation material mounted in a first portion of the space between said jacket wall means and said outer jacket member thereby leaving a second portion of the space between said jacket wall means and said outer jacket member open, said open space providing said air passageway extending between said air inlet and said air outlet.

18. A water heating system comprising:
a source of hot fluid;
a combined storage tank and heat exchanger unit including a watertight tank means having a water inlet means in the lower portion thereof and a water outlet means in the upper portion thereof, said watertight tank means further including a cylindrical jacket wall means forming at least a portion of the outer wall of the watertight tank means, said jacket wall means having an inlet means in the upper portion thereof in communication with said source of hot fluid, said jacket wall means further including an outlet means in the lower portion thereof and a passageway means extending within the jacket wall means from said inlet to said outlet means through which hot fluid can flow, said passageway means being sealed from the interior of said watertight tank means;
a source of water in communication with said water inlet means; and
a pressure sensitive water flow control valve means located at said water outlet means, said pressure sensitive water flow control valve means operatively connected to said hot fluid inlet means so that when the pressure at said hot fluid inlet means reaches a certain predetermined maximum said valve means will open to allow heated water to flow out said water outlet means to thereby automatically control the maximum pressure of said hot fluid at said hot fluid inlet.

* * * * *

UNITED STATES PATENT OFFICE
CERTIFICATE OF CORRECTION

Patent No. 4,148,355          Dated   April 20, 1979

Inventor(s)  Kenneth C. Gehring

It is certified that error appears in the above-identified patent and that said Letters Patent are hereby corrected as shown below:

In Claim 17, line 1, delete "22" and insert -- 16 --.

Signed and Sealed this

Fourth Day of September 1979

[SEAL]

Attest:

Attesting Officer

LUTRELLE F. PARKER
Acting Commissioner of Patents and Trademarks